United States Patent
Jo et al.

(10) Patent No.: US 9,604,574 B2
(45) Date of Patent: Mar. 28, 2017

(54) SYSTEM AND METHOD FOR ESTIMATING DRIVING LANE OF VEHICLE

(71) Applicant: Hyundai Mobis Co., Ltd., Seoul (KR)

(72) Inventors: Yun Jung Jo, Yongin-si (KR); Du Hyung Kim, Yongin-si (KR); Yong Kwan Ji, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/957,120

(22) Filed: Dec. 2, 2015

(65) Prior Publication Data

US 2016/0159349 A1 Jun. 9, 2016

(30) Foreign Application Priority Data

Dec. 3, 2014 (KR) .................. 10-2014-0171968

(51) Int. Cl.
*B60R 1/00* (2006.01)
*B60W 30/18* (2012.01)

(52) U.S. Cl.
CPC ......... *B60R 1/00* (2013.01); *B60W 30/18163* (2013.01); *B60R 2300/804* (2013.01); *B60W 2420/42* (2013.01); *B60W 2550/402* (2013.01)

(58) Field of Classification Search
CPC ............... B60R 1/00; B60R 2300/804; B60W 30/18163; B60W 2550/402; B60W 2420/42
See application file for complete search history.

(56) References Cited

U.S. PATENT DOCUMENTS

| 8,363,104 B2 * | 1/2013 | Imai | B60W 30/12 348/149 |
|---|---|---|---|
| 2011/0169958 A1 * | 7/2011 | Imai | B60W 30/12 348/149 |

FOREIGN PATENT DOCUMENTS

| JP | 2011-012965 | 1/2011 |
| KR | 10-1090588 | 12/2011 |
| KR | 10-2014-0087860 | 7/2014 |
| KR | 10-2014-0133332 | 11/2014 |

* cited by examiner

*Primary Examiner* — Rodney Butler
(74) *Attorney, Agent, or Firm* — H.C. Park & Associates, PLC

(57) ABSTRACT

A system for estimating a driving lane of a vehicle includes a road surface marking recognizing unit configured to recognize a road surface marking of a lane in which the vehicle is driving, a lane change determining unit configured to calculate a variation in a distance between the vehicle and the recognized road surface marking at a pre-set time interval, and compare the calculated variation with a preset value to generate lane change information. The system also includes a driving lane estimating unit configured to estimate the driving lane of the vehicle on the basis of information of the lane in which the vehicle is driving and the lane change information.

13 Claims, 4 Drawing Sheets

SYSTEM AND METHOD FOR ESTIMATING DRIVING LANE OF VEHICLE

CROSS-REFERENCE TO RELATED APPLICATION

This application claims priority under from and the benefits of Korean Patent Application No. 10-2014-0171968, filed on Dec. 3, 2014, which is hereby incorporated by reference for all purposes as if fully set forth herein.

BACKGROUND

Field

The present disclosure relates to a system and method for providing information regarding a lane in which a vehicle is driving, and more particularly, to a system and method for recognizing that a lane in which a vehicle is driving has been changed by utilizing information regarding recognized road surface marking near the vehicle, and estimating a lane in which the vehicle is currently driving.

Discussion of the Background

For the sake of safety of vehicles and convenience of drivers, research and development of an advanced driver assistance system (ADAS) or vehicle-to-vehicle (V2V) communication have actively been conducted, and one of key information required for ADAS or V2V is accurate information regarding a lane in which a vehicle is driving.

In order to obtain information regarding a lane in which a vehicle is driving, a method for obtaining information regarding a driving lane using information regarding a road in which a vehicle is driving and location information of the vehicle based on GPS signals may be used. However, an error of the GPS signals makes it difficult to accurately recognize a lane in which a vehicle is driving, and failure to accurately recognizing a driving lane leads to unreliability of a service provided through an ADAS or V2V.

Among related arts for solving the foregoing problem and recognizing a lane in which a vehicle is driving is Korean Patent Laid-open Publication No. 10-2014-0087860 (Entitled "Method for Estimating Current Lane", hereinafter, referred to as "related art 1").

In order to solve the problem in which a location of a vehicle in a transverse direction is not accurately estimated due to an error of GPS information, the related art 1 employs a scheme of recognizing left and right road surface markings of a vehicle through a camera sensor installed in the vehicle and estimating a lane in which the vehicle is driving through road information in which the vehicle is driving.

However, the related art 1 is based on a scheme in which, in recognizing left and right road surface markings of the vehicle, even a road surface marking not in proximity to the vehicle is recognized and compared with road information to estimate a driving lane. Thus, when other vehicles are driving nearby or when it is not easy to recognize a road surface marking through a camera sensor, a driving lane cannot be estimated.

Also, when a driving lane cannot be estimated with only recognized road surface marking information and road information, a driver should change a lane and subsequently compare two estimate values to determine a driving lane, causing driver's inconvenience of unnecessarily changing a lane.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure provides a system and method allowing a driving vehicle to recognize both road surface markings most adjacent thereto and estimate a lane in which the vehicle is driving by using variations in transverse distance between the vehicle and the recognized road surface markings.

Additional aspects will be set forth in the detailed description which follows, and, in part, will be apparent from the disclosure, or may be learned by practice of the inventive concept.

An exemplary embodiment discloses a system for estimating a driving lane of a vehicle includes a road surface marking recognizing unit configured to recognize a road surface marking of a lane in which the vehicle is driving, a lane change determining unit configured to calculate a variation in a distance between the vehicle and the recognized road surface marking at a preset time interval, and compare the calculated variation with a preset value to generate lane change information. The system also includes a driving lane estimating unit configured to estimate the driving lane of the vehicle on the basis of information of the lane in which the vehicle is driving and the lane change information.

An exemplary embodiment also discloses a method for estimating a driving lane of a vehicle. The method includes recognizing a road surface marking of a lane in which a the vehicle is driving, calculating a variation in a shortest distance between a center of the vehicle and the recognized road surface marking at a preset time interval, comparing the calculated variation with a preset value and estimating the driving lane of the vehicle according to a comparison result, and providing information regarding the estimated driving lane to a navigation device installed in the vehicle.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
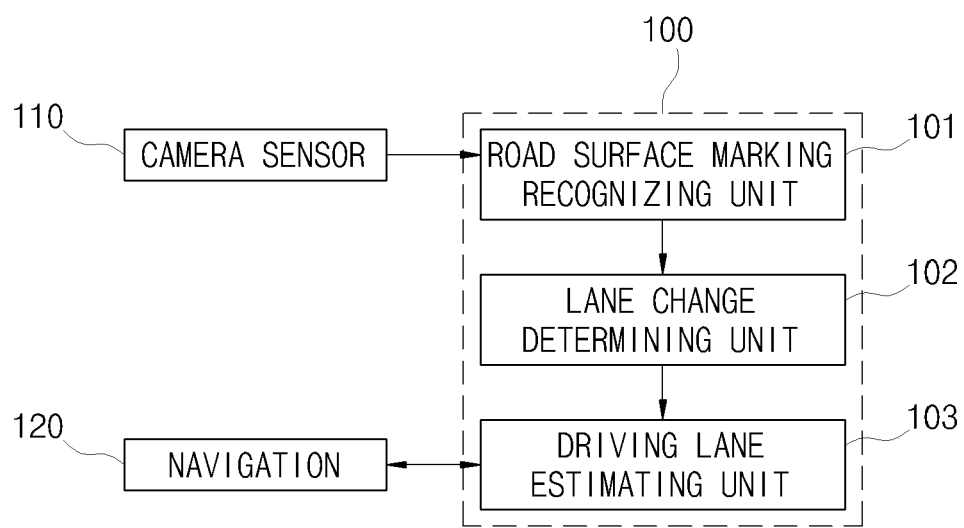
FIG. 1 is a block diagram illustrating a structure of a system for estimating a driving lane of a vehicle according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the drawings, the size and relative sizes of regions and components may be exaggerated for clarity. Like numerals denote like elements.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram illustrating a structure of a system for estimating a driving lane of a vehicle according to an exemplary embodiment.

A system 100 for estimating a driving lane of a vehicle may include a road surface marking recognizing unit 101, a lane change determining unit 102, and a driving lane estimating unit 103.

The road surface marking recognizing unit 101 may recognize a road surface marking of a lane in which a vehicle is driving, and transmit information regarding the recognized road surface marking to the lane change determining unit 102.

The road surface marking recognizing unit 101 may recognize a road surface marking closest to the vehicle, among road surface markings positioned on the left of the vehicle, and may recognize a road surface marking closest to the vehicle, among road surface markings positioned on the right of the vehicle. The road surface marking recognizing unit 101 may measure a transverse distance between the center of the vehicle and the recognized road surface marking and may transmit information regarding the measured transverse distance to the lane change determining unit 102.

The lane change determining unit 102 may receive information regarding the road surface markings positioned on the left and right of the vehicle and closest to the vehicle.

The lane change determining unit 102 may calculate variations in the transverse distance between the vehicle and the road surface markings received from the road surface marking recognizing unit 101 at a preset time interval. The lane change determining unit 102 may compare the calculated variations with a preset value to determine whether the vehicle has changed a driving lane.

When a vehicle changes a driving lane, a transverse distance between the vehicle and a road surface marking is rapidly changed, and here, whether a vehicle has changed a driving lane may be determined by calculating variations in the transverse distance between a vehicle and a white link marker at a preset time interval.

Figure 3:
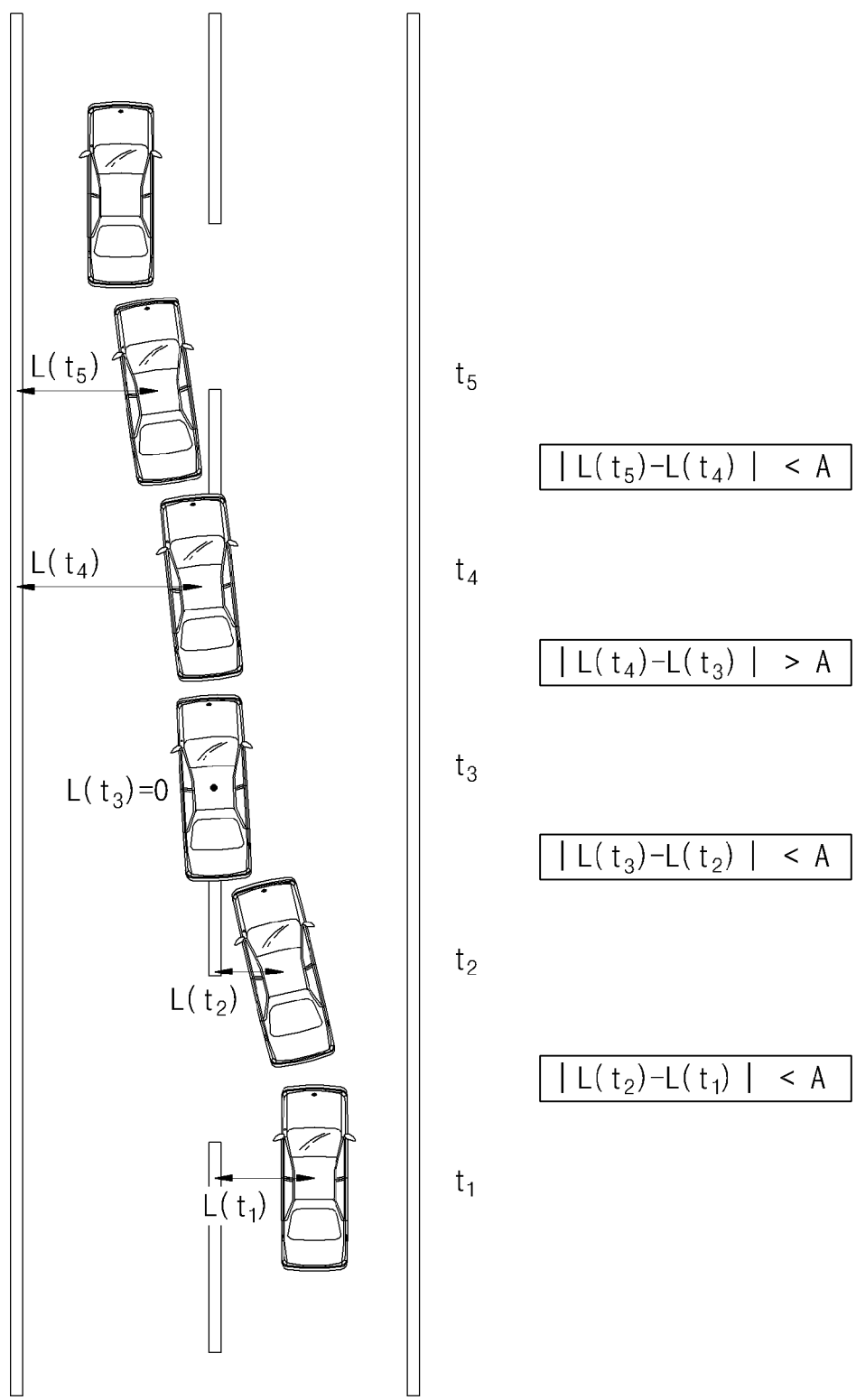
FIGS. 3 and 4 are views illustrating a system for estimating a driving lane of a vehicle according to an exemplary embodiment.
Figure 4:
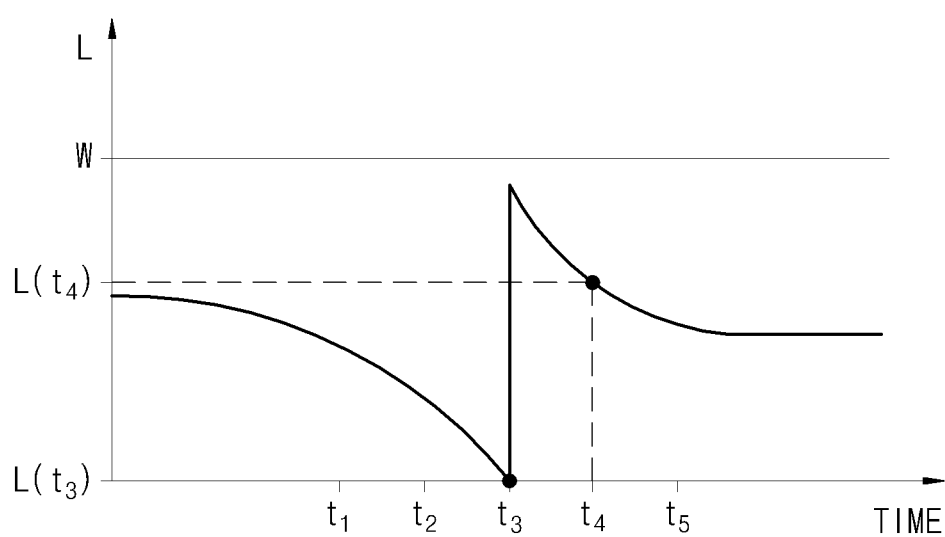

FIGS. 3 and 4 are views illustrating a system for estimating a driving lane of a vehicle according to an exemplary embodiment determines whether a driving lane has been changed.

FIG. 3 is a view illustrating an exemplary embodiment of determining whether a driving lane has been changed by measuring a transverse distance between the vehicle and a left road surface marking. As illustrated in FIG. 3, the system 100 for estimating a driving lane of a vehicle may measure distances between the vehicle and the left road surface marking at points in time $t_1$, $t_2$, $t_3$, $t_4$, and $t_5$ and measured distances are $L(t_1)$, $L(t_2)$, $L(t_3)$, $L(t_4)$, and $L(t_5)$.

The intervals between the points in time $t_1$, $t_2$, $t_3$, $t_4$, and $t_5$ are equal, and the time interval may be set to be decreased as a velocity of the vehicle increases.

The lane change determining unit 102 may calculate variations in the transverse distances $|L(t_2)-L(t_1)|$, $|L(t_3)-L(t_2)|$, $|L(t_4)-L(t_3)|$, and $|L(t_5)-L(t_4)|$ by using the transverse distances between the vehicle and the road surface marking respectively measured at the foregoing points in time. The lane change determining unit 102 may compare the calculated variations in the transverse distances with a preset value A to determine whether the variations are greater than the preset value A.

Here, the preset value A may be set to a value smaller than a width W of the lane obtained from road information in which the vehicle is driving, and may be set by using the width (W) of the lane (e.g., ½ and ⅔ of the width (W) of the lane).

As illustrated in FIG. 3, since the vehicle is driving in the same lane between points in time $t_1$ and $t_2$ and between $t_2$ and $t_3$, it can be seen that the variation in the transverse distance between the vehicle and the road surface marking is smaller than the preset value A. However, when the vehicle moves to the left lane from the lane in which the vehicle has been driving, it can be seen that the transverse distance between the vehicle and the left road surface marking becomes equal to the width (W) (at the point in time $t_3$) and the variation $|L(t_4)-L(t_3)|$ in the transverse distance is greater than the preset value A.

Thus, the lane change determining unit 102 may determine whether the vehicle has changed a driving lane by calculating the variation in the transverse distance between the vehicle and the road surface marking and comparing the calculated variation with the preset value A.

The lane change determining unit 102 determines whether a driving lane has been changed based on a variation in the transverse distance between the vehicle and the road surface marking, and may determine a direction in which a lane has been changed based on a changed state of the transverse distance between the vehicle and the road surface marking.

According to an exemplary embodiment, when it is sensed that a driving lane of a vehicle has been changed, it may be estimated that the lane has been changed in a direction in which the transverse distance between the vehicle and the road surface marking decreases in a section prior to a section in which lane changing has been sensed.

For example, as illustrated in FIG. 4, referring to a state of the change in the transverse distance in the section of $t_2$ to $t_3$ prior to the point in time $t_4$ at which changing of a driving lane by the vehicle was sensed, it can be seen that, since $L(t_3)<L(t_2)$, the transverse distance between the vehicle and the road surface marking decreases. Although not shown in FIG. 4, it can be seen that the transverse distance between the vehicle and a right road surface marking increases up to the point in time $t_3$.

Thus, when changing of a driving lane by the vehicle is sensed, it may be estimated that the driving lane has been changed in a direction in which the transverse distance between the vehicle and the road surface marking in a previous section decreases.

According to another exemplary embodiment, the lane change determining unit 102 may receive information regarding a steering angle from a steering angle sensor of the vehicle and determine a movement direction of the vehicle on the basis of the steering angle of the vehicle.

The lane change determining unit 102 may generate lane change information including whether a lane has been changed based on the variations in the transverse distance between the vehicle and the road surface marking and information regarding a lane change direction, and may transmit the generated lane change information to the driving lane estimating unit 103.

When the lane change information is received from the lane change determining unit 102, the driving lane estimating unit 103 may estimate the current driving lane of the vehicle by using the information regarding the lane in which the vehicle has been driving and the received lane change information.

For example, when it is determined that the vehicle, which has been driving in K lane of an N-lane road, has changed a lane and a lane change direction is the left side, the driving lane is changed to K−1. Also, when the lane change direction is the right side, the driving lane is changed to K+1.

According to another exemplary embodiment, when it is determined that the vehicle has entered an expressway, the lane number information N of the expressway in which the vehicle is currently driving is received from a navigation device of the vehicle. Here, since the vehicle enters the expressway from the right-most lane, the lane K in which the vehicle is currently driving is set to N (i.e., the current driving lane is a fourth lane immediately after the vehicle enters the four-lane expressway).

Thus, since the current driving lane may be recognized through the expressway entry information, a lane in which the vehicle is driving may be continuously estimated according to lane change information generated by the lane change determining unit 102.

According to an exemplary embodiment, whether a vehicle has changed a driving lane and a lane change direction can be recognized by measuring a distance between a vehicle and an adjacent road surface marking, whereby a driving lane of the vehicle may be accurately estimated. Also, since information regarding an estimated driving lane is provided to a navigation system, an advanced driver assistance system (ADAS), and the like, driving lane information may be allowed to be used.

Figure 2:
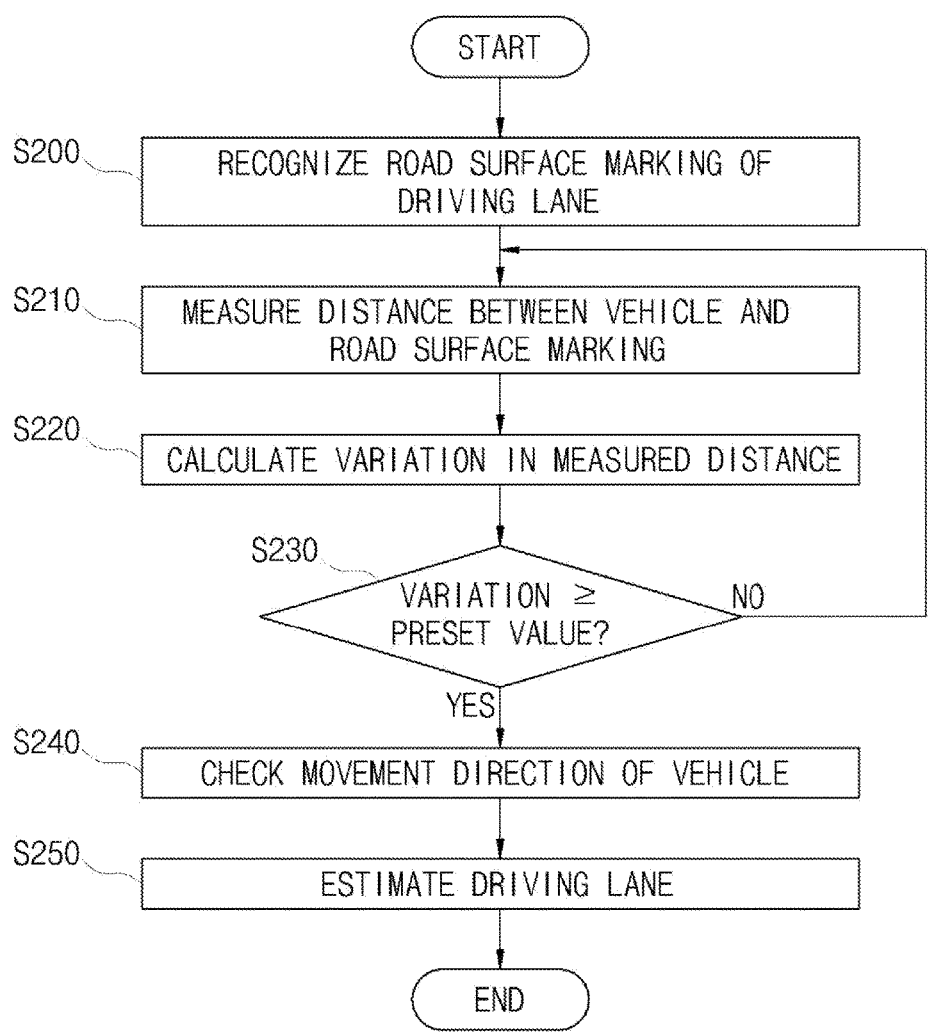
FIG. 2 is a flow chart illustrating a process of a method of estimating a driving lane of a vehicle according to an exemplary embodiment.

FIG. 2 is a flow chart illustrating a process of a method of estimating a driving lane of a vehicle according to an exemplary embodiment.

The system for estimating a driving lane of a vehicle recognizes left and right road surface markings of a lane in which a vehicle is driving through a camera sensor installed in the vehicle in step S200. The system for estimating a driving lane of a vehicle may recognize only a road surface marking closest to the vehicle. When the system for estimating a driving lane of a vehicle recognizes a road surface marking, the system for estimating a driving lane of a vehicle may measure a transverse distance between the vehicle and the recognized road surface marking in step S210.

The system for estimating a driving lane of a vehicle may calculate variations in the measured transverse distance at a preset time interval in step S220, and may determine whether the calculated variations are greater than the preset value in step S230.

When the vehicle changes a driving lane by recognizing only the left and right road surface markings closest to the vehicle, only the recognized left and right lanes will be changed. Thus, a transverse distance to a road surface marking in a direction in which the vehicle has moved is equal to the width of the entire lane to which the vehicle has move, and a transverse distance to a road surface marking in the opposite direction is close to 0.

Thus, it can be estimated that the driving lane has been changed in the section in which the transverse distance is rapidly changed, namely, in the section in which the variation in the transverse distance is greater than the preset value.

When the variation in the transverse distance between the vehicle and the road surface marking is greater than the preset value, the system for estimating a driving lane of a vehicle may determine that lane changing has been made and may determine a movement direction of the vehicle in step S240.

A movement direction of the vehicle may be estimated as a direction in which a transverse direction between the vehicle and the road surface marking decreases in a section prior to a time section in which the change in the driving lane of the vehicle was sensed.

When the change in the driving lane of the vehicle is sensed and the movement direction of the vehicle is determined, the system for estimating a driving lane of a vehicle may estimate a lane in which the vehicle is currently driving by using the information of the lane in which the vehicle has been driving, information regarding whether the lane has been changed, and information regarding a lane change direction in step S250.

According to an exemplary embodiment, a driving lane of the vehicle can be accurately estimated because a road surface marking closest to a vehicle is recognized and a transverse distance between the vehicle and the road surface marking is measured to determine whether a lane has been changed or a lane change direction.

The system 100 and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, system 100 and/or one or more components thereof may include or otherwise be associated with one or more memories (not shown) including code (e.g., instructions) configured to cause the system 100 and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A system for estimating a driving lane of a vehicle, the system comprising:
   a processor of the vehicle configured to:
   receive image data from a camera sensor;
   recognize a road surface marking of a lane in which the vehicle is driving from the image data;
   determine which road surface marking is closest to the vehicle among road surface markings positioned on at least one of the left and the right of the vehicle;
   calculate a variation in a distance between the vehicle and the recognized road surface marking at a preset time interval;
   compare the calculated variation with a preset value to generate lane change information; and
   estimate the driving lane of the vehicle on the basis of information of the lane in which the vehicle is driving and the lane change information.

2. The system of claim 1, wherein the processor of the vehicle is configured to generate the lane change information comprising information regarding whether the calculated variation is equal to or greater than the preset value and information regarding a movement direction of the vehicle.

3. The system of claim 1, wherein the processor of the vehicle generates the lane change information comprising information regarding a direction in which the distance between the vehicle and the recognized road surface marking decreased when the calculated variation is equal to or greater than the preset value.

4. The system of claim 1, wherein the processor of the vehicle calculates a variation in a shortest distance between a center of the vehicle and the recognized road surface marking at the preset time interval.

5. The system of claim 1, wherein the processor of the vehicle adjusts the preset time interval in inverse proportion to a velocity of the vehicle and calculates a variation in the distance between the vehicle and the recognized road surface marking.

6. The system of claim 1, wherein the processor of the vehicle sets the preset value on the basis of a width of the lane comprised in a road on which the vehicle is driving.

7. The system of claim 1, wherein when the calculated variation is equal to or greater than the preset value, the processor of the vehicle estimates that the driving lane of the vehicle has been changed in a movement direction of the vehicle.

8. The system of claim 1, wherein when it is determined that the vehicle has entered a right-most lane of an expressway, the processor of the vehicle sets the driving lane according to a number of lanes of the expressway, and estimates the driving lane of the vehicle according to the lane change information generated by the processor of the vehicle.

9. A method for estimating a driving lane of a vehicle, the method comprising:
   receiving image data from a camera sensor at a processor, the processor:
   recognizing a road surface marking of a lane in which the vehicle is driving in the image data received from the camera sensor;
   determining which road surface marking is closest to the vehicle among road surface markings positioned on at least one of the left and the right of the vehicle;
   calculating a variation in a shortest distance between a center of the vehicle and the recognized road surface marking at a preset time interval;

comparing the calculated variation with a preset value and estimating the driving lane of the vehicle according to a comparison result; and providing information regarding the estimated driving lane to a navigation device installed in the vehicle.

10. The method of claim 9, wherein the estimating of the driving lane of the vehicle according to the comparison result further comprises estimating that the driving lane of the vehicle has changed in a direction in which a distance between the vehicle and the recognized road surface marking decreased when the calculated variation is equal to or greater than the preset value.

11. The method of claim 9, wherein the estimating of the driving lane of the vehicle according to the comparison result further comprises setting the driving lane of the vehicle according to a number of lanes of the expressway when it is determined that the vehicle has entered a rightmost lane of the expressway, and estimating the driving lane of the vehicle according to a result obtained by comparing the calculated variation with the preset value.

12. The method of claim 9, wherein the calculating of a variation in shortest distance between the center of the vehicle and the recognized road surface marking at the preset time interval further comprises adjusting the preset time interval according to a driving speed of the vehicle and calculating a variation in shortest distance between the center of the vehicle and the recognized road surface marking.

13. The method of claim 9, further comprising providing information regarding the estimated driving lane to a navigation device installed in the vehicle.

* * * * *